United States Patent

Lösch

[19]

[11] Patent Number: 5,940,568
[45] Date of Patent: Aug. 17, 1999

[54] PLANAR OPTICAL WAVEGUIDE, PLANAR OPTICAL WAVEGUIDE WITH BRAGG GRATING, AND METHOD OF FABRICATING SUCH A PLANAR OPTICAL WAVEGUIDE

[75] Inventor: Kurt Lösch, Stuttgart, Germany

[73] Assignee: Alcatel Alsthom Compagnie Generale d'Electricite, Paris, France

[21] Appl. No.: 08/974,593

[22] Filed: Nov. 19, 1997

[30] Foreign Application Priority Data

Nov. 19, 1996 [DE] Germany ................... 196 47 789

[51] Int. Cl.⁶ ............................................. G02B 6/10
[52] U.S. Cl. ........................ 385/129; 385/14; 385/37; 385/130; 385/131; 385/141
[58] Field of Search ................... 385/31, 37, 129, 385/130, 131, 132, 141, 14; 430/290

[56] References Cited

U.S. PATENT DOCUMENTS

| | | | |
|---|---|---|---|
| 4,474,427 | 10/1984 | Hill et al. ........................... | 385/37 X |
| 5,367,588 | 11/1994 | Hill et al. ........................... | 385/37 |
| 5,480,764 | 1/1996 | Gal et al. ........................... | 430/321 |
| 5,609,797 | 3/1997 | Chakravorty ..................... | 385/132 X |
| 5,633,966 | 5/1997 | Nakaishi ............................ | 385/37 |
| 5,675,691 | 10/1997 | Edlinger et al. ................... | 385/130 |
| 5,745,617 | 4/1998 | Starodubov et al. .............. | 385/37 |

FOREIGN PATENT DOCUMENTS

| | | | |
|---|---|---|---|
| 0441693 | 8/1991 | European Pat. Off. ............ | 385/37 X |
| 0668514 | 8/1995 | European Pat. Off. ............ | 385/37 X |
| 0546705 | 3/1996 | European Pat. Off. ............ | 385/37 X |
| 0701150 | 3/1996 | European Pat. Off. ............ | 385/37 X |
| 0736783 | 10/1996 | European Pat. Off. ............ | 385/37 X |
| 4337103 | 5/1994 | Germany ........................... | 385/37 X |
| 08086929 | 4/1996 | Japan ................................. | 385/37 X |

OTHER PUBLICATIONS

"Fabrication of SiO$_2$–TiO$_2$ Glass Planar Optical Waveguides by Flame Hydrolysis Deposition", Electronic Letters, vol. 19, No. 15 (1983) pp. 583–584.

"Silica–based integrated optical components for telecommunications applications", Optical Engineering, vol. 32, No. 5 (1983), pp. 1011–1014.

"Planar waveguide Mach–Zender bandpass filter fabricated with single exposure UV–induced gratings", OFC '96 Technical Digest, p. 277 by G.E. Kohnke et al.

*Primary Examiner*—Brian Healy
*Attorney, Agent, or Firm*—Ware, Fressola, Van Der Sluys & Adolphson LLP

[57] ABSTRACT

It is known to expose a photosensitive waveguide core to an optical interference pattern which is produced using a phase mask. Precise positioning of the phase mask above the optical waveguide is difficult if several Bragg gratings are to be produced in a confined space. The invention solves the problem of how to produce virtually arbitrarily defined refractive-index gratings in a core of an optical waveguide with high precision without the use of phase masks. To accomplish this, a buffer layer of the optical waveguide, preferably the cladding layer (CLA), is patterned in such a way that UV laser light directed to the waveguide forms an optical interference pattern in the core (COR), thereby imprinting a Bragg grating. The pattern (GST) in the buffer layer is preferably formed by etching.

9 Claims, 4 Drawing Sheets

PLANAR OPTICAL WAVEGUIDE, PLANAR OPTICAL WAVEGUIDE WITH BRAGG GRATING, AND METHOD OF FABRICATING SUCH A PLANAR OPTICAL WAVEGUIDE

TECHNICAL FIELD

This invention relates to planar optical waveguides. In particular, the invention relates to planar optical waveguides with a core whose refractive index varies periodically in the direction of propagation of the light guided in the core. Such periodic variations of the refractive index are referred to as "refractive-index gratings" or "Bragg gratings". The invention further relates to a method of fabricating planar optical waveguides with Bragg gratings.

BACKGROUND OF THE INVENTION

In planar optical waveguides, Bragg gratings are used, for example, to filter out of chromatic light a fraction with a defined wavelength. This wavelength is referred to as the Bragg wavelength and is determined by the period of the Bragg grating. In optical frequency-division multiplexing communication systems, such wavelength filters can be used as integrated optical multiplexers or demultiplexers.

There are various ways of producing Bragg gratings in planar optical waveguides. One possibility is to provide the core of the optical waveguide with periodically disposed recesses as is described, for example, in EP-B1-0 546 705. From EP-A1-0 701 150 it is known to apply a high-index coating to the vertical surfaces of these recesses.

Another approach uses the photosensitivity of the waveguide core. A material is called photosensitive if its refractive index can be increased by irradiation with light. The photosensitivity will generally be highest if the material is irradiated with short-wavelength light as is generated by UV lasers, for example. The core layers of most conventional optical waveguide structures are photosensitive; however, the photosensitivity can also be increased selectively by taking suitable measures, as will be explained below.

To imprint a Bragg grating in the photosensitive core of an optical waveguide with the aid of UV light, an optical interference pattern is formed in the core. This can be done, for example, by coupling laser light into the core. If the light wave is reflected at the end of the waveguide opposite the coupling point, a standing wave in which intensity maxima and minima follow each other at regular intervals will be produced in the waveguide. Such a method is described for optical fibers in U.S. Pat. No. 4,474,427.

Another method of producing an optical interference pattern consists of directing collimated UV light through a phase mask to form an interference pattern at the rear of the phase mask, to which the waveguide structure is exposed. At those points where the light waves are constructively superposed in the interference pattern, the light intensity is so high that the refractive index in the waveguide core changes permanently.

Such a fabrication process using a phase mask is described in DE-A1-43 37 103. FIG. 7 shows a waveguide structure deposited on a substrate SUB and consisting of a lower buffer layer BUF, a core COR, and an upper buffer layer (=cladding layer) CLA. Disposed directly above the waveguide structure is a phase mask PM in the form of a quartz body provided with a surface-relief structure. The surface-relief pattern approximately corresponds to the pattern of a periodic rectangular wave with a period of about 1000 nm. This phase mask PM is irradiated with UV light from an excimer laser. Below the phase mask PM, i.e., within the waveguide structure, an interference pattern is formed. If the individual parameters of the process (including period and amplitude of the surface-relief structure, wavelength of the laser) are chosen appropriately, the diffracted zerothorder beams indicated in FIG. 7 as FOR can be largely suppressed, so that nearly exclusively the divergent first-order beams SOR will impinge on the core COR of the optical waveguide and imprint a Bragg grating GRA therein.

With the process described in DE-A1-43 37 103, highly precise Bragg gratings can be produced in optical waveguides in a relative simply manner. A disadvantage is, however, that such a phase mask permits the fabrication of only one Bragg grating with a given Bragg wavelength at a time. For certain applications, however, it is necessary to imprint several Bragg gratings with different Bragg wavelengths in a confined space. An example of such an application is a cascaded add&drop multiplexer, which will be dealt with in more detail below. If several Bragg gratings with different Bragg wavelengths are to be imprinted in a confined space using the method just described, a different phase mask must be used for each Bragg grating. In addition, it is very difficult in that case to precisely position the individual phase masks relative to the core of the optical waveguide.

A remedy for this is provided by a method disclosed in EP-A2-736 783. There, a mask is first applied to the clad layer of a planar optical waveguide using conventional photolithographic techniques. The planar optical waveguide is then irradiated through the mask with light of a suitable wavelength. The effect is the same as with the use of a phase mask, i.e., by forming an interference pattern,.a Bragg grating is imprinted in the photosensitive core of the optical waveguide. Thus, the phase mask is functionally integrated with the optical waveguide and, therefore, need not be aligned. A disadvantage is that the mask applied to the optical waveguide is not resistant to aging. Therefore, the waveguide must be irradiated with light immediately after fabrication of the mask. The possibility to determine the Bragg wavelength of the grating much later via the wavelength of the light used for irradiation does not exist. In addition, a considerable part of the light is reflected or absorbed by the mask. The efficiency with which the Bragg grating is imprinted is correspondingly low, and the refractive-index differences obtainable are correspondingly small. An arbitrary increase in light power is not possible since this could damage the mask.

SUMMARY OF THE INVENTION

It is therefore an object of the invention to provide a method whereby Bragg gratings can be produced in planar optical waveguides and which does not have the above-mentioned disadvantages of the known solutions. The method is to permit several Bragg gratings with different Bragg wavelengths to be produced in arbitrary configurations, particularly in a very confined space. No difficult active alignment steps are to necessary. Furthermore, a planar optical waveguide is provided which is an intermediate product of the production method according to the invention.

The present invention attains the object above. First, a planar optical waveguide having a core and at least two buffer layers, the refractive index of the core being locally variable by irradiation with light of suitable wavelength and intensity, wherein one of the buffer layers is patterned such that a light beam passing through said patterned buffer layer and then falling on the core will form an optical interference pattern in at least one spatially limited region of the core, thereby permanently imprinting a refractive-index grating in said spatially limited region of the core, is fabricated as an intermediate product. According to the invention, the cladding layer of this planar optical waveguide is patterned such that irradiation with (short-wavelength) light will cause a Bragg grating to be imprinted directly into the core. No separate phase mask is needed; in addition, the pattern in the cladding layer is resistant to aging and, when being irradiated, reflects or absorbs only very little light, so that the Bragg grating is imprinted with a high efficiency.

The planar optical waveguide may further have the thickness of the patterned buffer layer vary periodically in the region of the optical waveguide in which a refractive-index grating is to be imprinted in the core.

The planar optical waveguide may further have the periodic variation of the patterned buffer layer be rectangular in configuration.

Instead of the cladding layer, another buffer layer may be patterned. Patterning the lower buffer layer will be advantageous, for example, if the core is illuminated from below through the substrate rather than from the top side of the optical waveguide. In that case, the surface of the waveguide will remain free of recesses or additional layers.

The pattern in the buffer layer for forming the interference pattern is preferably defined using lithographic techniques, such as photolithography, electron-beam lithography, or ion-beam lithography. This ensures a very high patterning precision. In addition, there is great freedom in the design of the pattern. Thus, the Bragg grating in the waveguide core can be configured according to nearly arbitrary specifications and imprinted with corresponding precision.

BRIEF DESCRIPTION OF THE DRAWINGS

The invention and its advantageous features will now be described in detail with reference to the accompanying drawings. The drawings are not to scale. Similar reference characters have been used to designate corresponding elements throughout the drawings, in which.

BEST MODE FOR CARRYING OUT THE INVENTION

Figure 1:
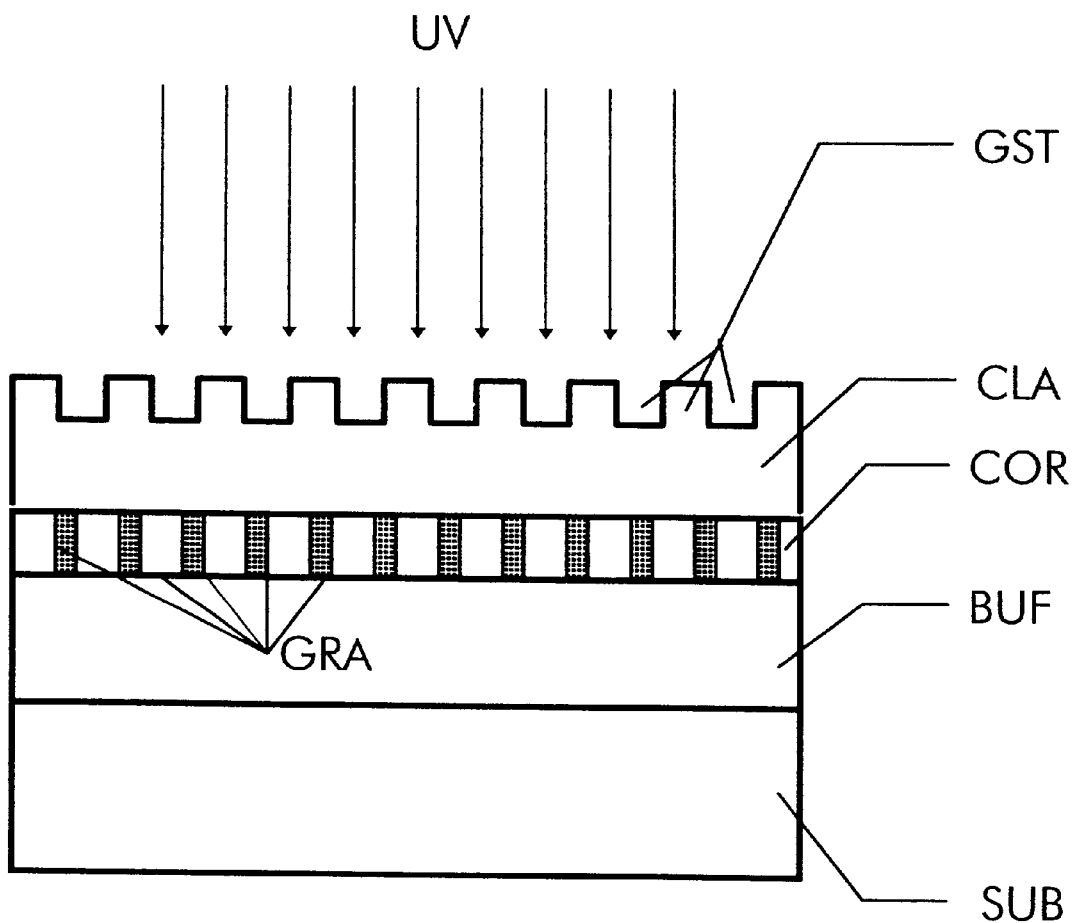
FIG. 1 is a longitudinal section of a planar optical waveguide according to the present invention.

FIG. 1 shows a planar optical waveguide according to the invention in a longitudinal section. The optical waveguide has a core COR and at least two buffer layers BUF and CLA. If only two buffer layers are present as shown in FIG. 1, one of them (CLA) also acts as the upper cladding layer. The buffer layers BUF and CLA have the property that their respective refractive indices are less than that of the core COR. As a result, light coupled into the core is guided in the waveguide. The core COR may be implemented as a buried-stripe waveguide or a film waveguide, for example. The optical waveguide is deposited on a substrate. The substrate may be made of a semiconductor material, such as silicon or indium phosphide, or of glass or ceramic, for example.

Such planar optical waveguides can be fabricated from various materials. Commonly used materials are, for example, polymers or silicates which are deposited as thin layers on a substrate by techniques described in detail elsewhere; see, for example, B. Kawachi et al, "Fabrication of $SiO_2$—$TiO_2$ Glass Planar Optical Waveguides by Flame Hydrolysis Deposition", Electronic Letters, Vol. 19, No. 15 (1983) pages 583–584, or J. J. G. Allen et al, "Silica-based integrated optic components for telecommunications applications", Optical Engineering, Vol. 32, No. 5 (1993), pages 1011–1014.

The waveguide core is made of a photosensitive material. As mentioned above, most of the materials commonly used for waveguide cores are photosensitive. One possibility of increasing the photosensitivity in germanium-doped silica cores is to expose the core to molecular hydrogen. If the core is irradiated with an UV laser, the germanium atoms in the core will react with the hydrogen atoms diffused into the core. At these points, the density, and thus the refractive index, of the core increases.

In the embodiment shown in FIG. 1, the cladding layer CLA is provided with a surface pattern. This pattern GST has the form of stripelike recesses oriented normal to the direction of the optical waveguide, as are also shown—not to scale—in FIGS. 2 and 3 (GST1 and GST2), which are discussed below. A coherent light beam which falls on this pattern GST from above is diffracted at the recesses, whereby an optical interference pattern is formed below the pattern, and thus also in the waveguide core.

The surface structure can be fabricated using a variety of techniques. The selection of the technique depends on, among other things, the materials from which the optical waveguide is fabricated. In a silica waveguide deposited on a substrate by flame hydrolysis deposition (FHD), for example, the structure can be formed by electron-beam lithography and subsequent dry etching.

Figure 2:
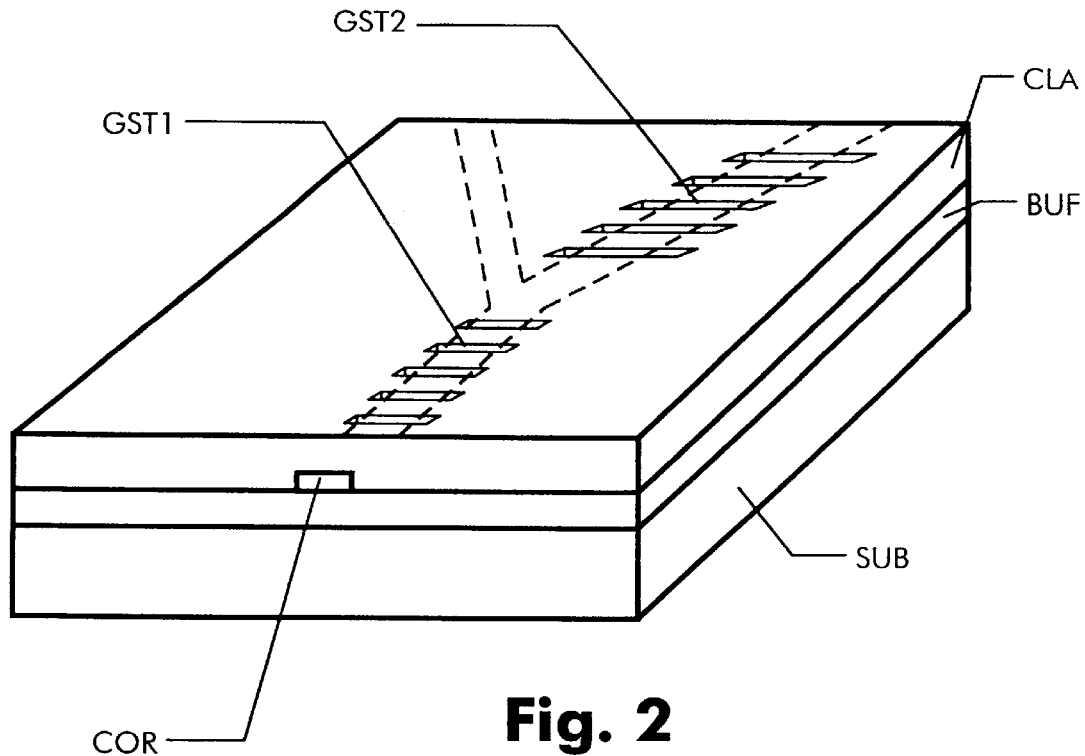
FIG. 2 is a perspective view of a planar optical waveguide where the periodic variation of the patterned buffer layer is rectangular.
Figure 3:
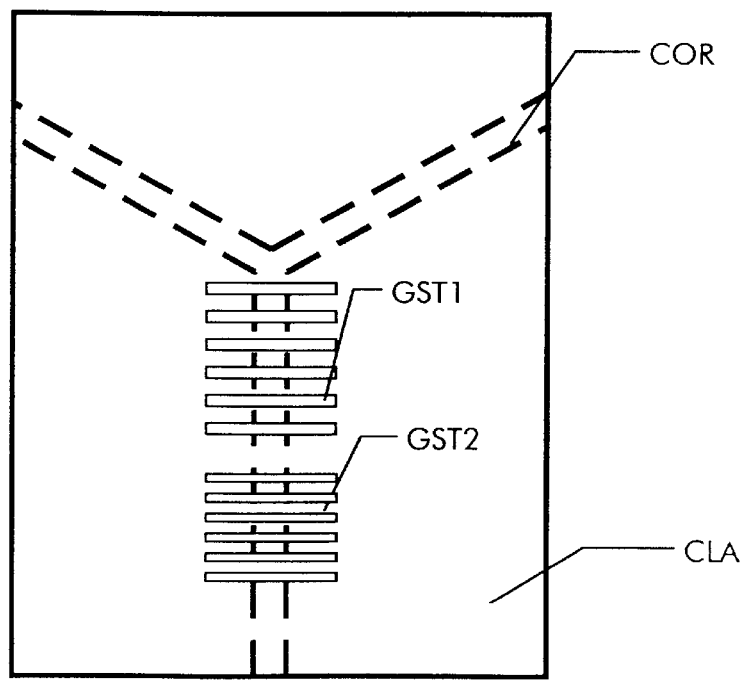
FIG. 3 is a top view of a planar optical waveguide where the periodic variation of the patterned buffer layer is rectangular.
Figure 5:
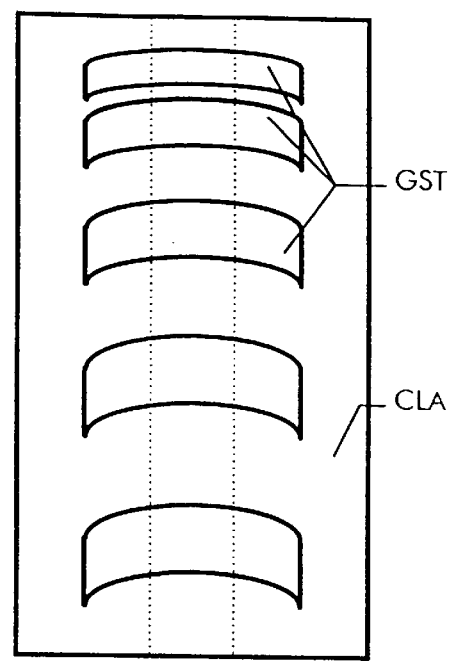
FIG. 5 is a top view of an optical waveguide according to the invention having curved, irregularly spaced recesses in the cladding layer.

The above-described embodiment can be modified and supplemented in various ways. For example, as mentioned above, the surface pattern need not necessarily be formed in the cladding layer. It may be more advantageous to cover the patterned buffer layer with further layers. The patterned buffer layer may also be located on the substrate side. In FIG. 1, instead of the cladding layer, the buffer layer BUF would be provided with regularly spaced recesses which would be filled with a suitable material. The laser light illumination could then take place either from below through the substrate SUB or, if the substrate surface or a reflecting layer thereon reflects the laser light, from above. By an appropriate choice of the shape of the pattern, virtually arbitrarily defined refractive index gratings can be impressed in the waveguide core. In FIGS. 1 and 2, the shape of the pattern is rectangular in profile. Also possible are sinusoidal patterns, for example. In principle, the patterns may be nonperiodic, as in the case of the optical waveguide shown in FIG. 5 in a top view. Here the cladding layer CLA is provided with recesses GST whose spacing increases uniformly.

Figure 4:
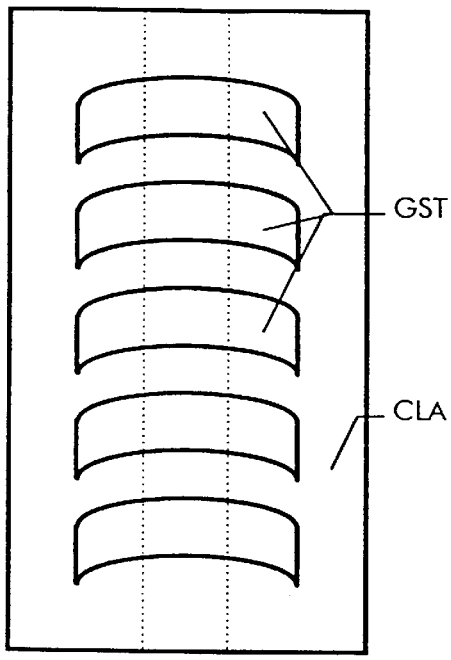
FIG. 4 is a top view of an optical waveguide according to the invention having curved recesses in the cladding layer.

In addition, the patterns need not be oriented normal to the propagation direction of the light in the waveguide. It may also be more advantageous to implement the patterns as slightly curved striations rather than rectangular ones. The optical waveguides shown in FIGS. 4 and 5 in top views have such curved recesses GST in the cladding layer CLA.

The first step of the novel method of fabricating a planar optical waveguide with a Bragg grating is to fabricate a planar optical waveguide such as a planar optical waveguide having a core and at least two buffer layers, the refractive index of the core being locally variable by irradiation with light of suitable wavelength and intensity, wherein one of the buffer layers is patterned such that a light beam passing through said patterned buffer layer and then falling on the core will form an optical interference pattern in at least one spatially limited region of the core, thereby permanently imprinting a refractive-index grating in said spatially limited region of the core.

This planar optical waveguide may further have the thickness of the patterned buffer layer vary periodically in the region of the optical waveguide in which a refractive-index grating is to be imprinted in the core.

This planar optical waveguide may still further have the periodic variation of the patterned buffer layer be rectangular in configuration.

This fabricating was explained in detail in the above sections. In a second step, the planar optical waveguide is illuminated with a coherent light beam. If the patterned buffer layer is the cladding layer, the waveguide will be illuminated from above; if a buffer layer on the side of the substrate is patterned, illumination from the substrate side may be appropriate.

The more monochromatic the incident light, the sharper the interference pattern will be. If, as is generally required, the imprinted Bragg grating is to be very regular, it must be ensured that the light beam is collimated. If the light source is a loser, these requirements are satisfied automatically. As explained above, photosensitive materials react particularly vigorously to intensive UV light. Therefore, the light source used to imprint the Bragg grating into the waveguide core COR will preferably be a UV laser, e.g., an excimer laser. It goes without saying that the cladding layer CLA and the core COR must be made of a material which is transparent to this incident light, so that the light can penetrate into the core.

Figure 6:
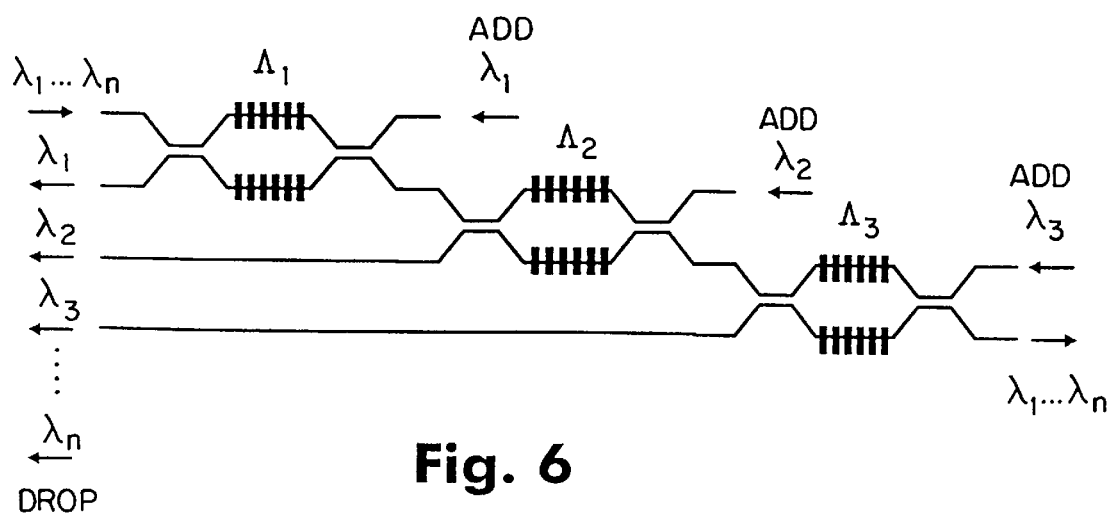
FIG. 6 is a schematic representation of a cascaded multiple add & drop multiplexer in which the invention has been implemented.
Figure 7:
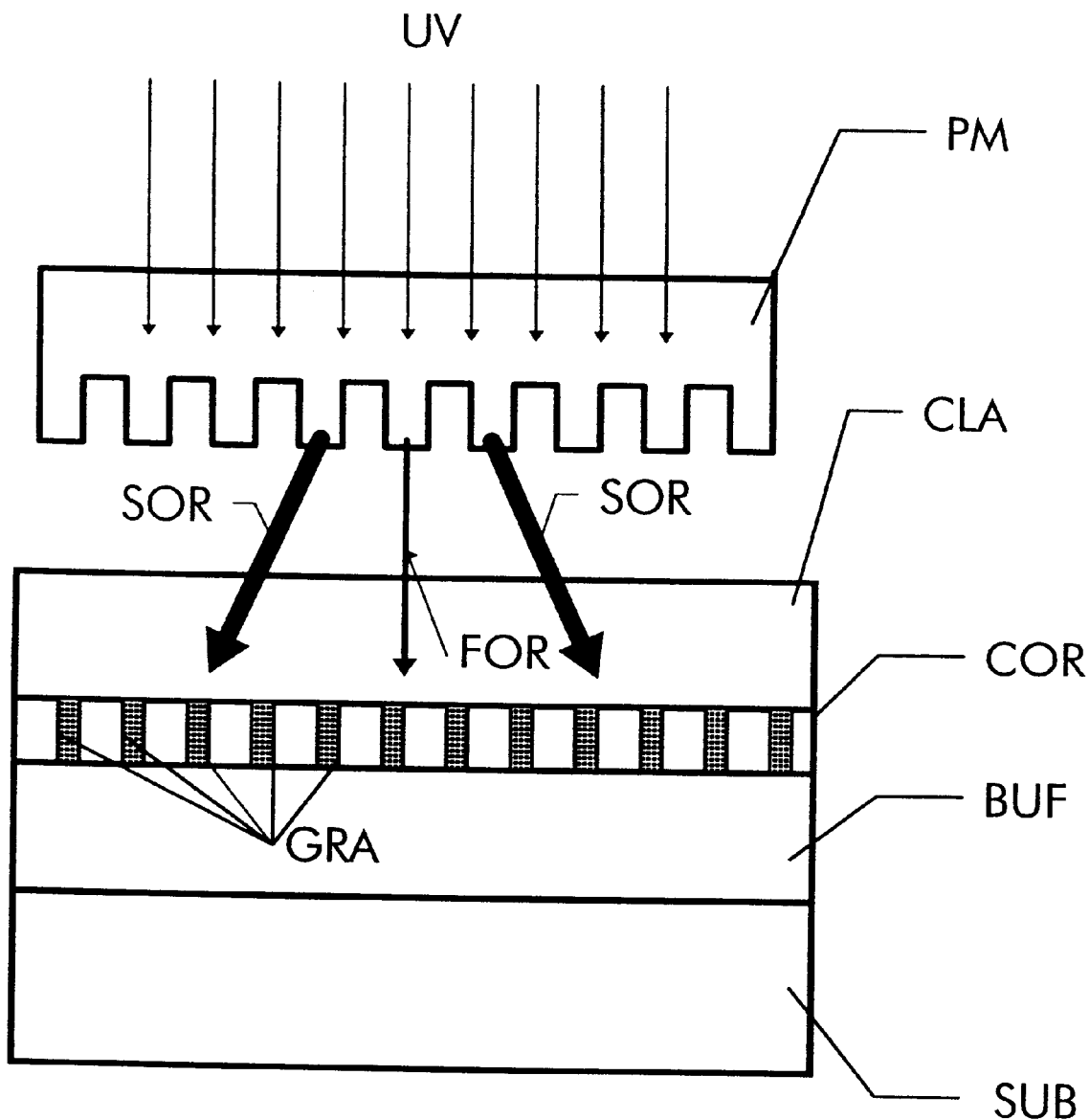
FIG. 7 is a longitudinal section of a prior-art arrangement with which a Bragg grating can be imprinted in a planar optical waveguide.

FIG. 6 shows a preferred application of the invention in which several Bragg gratings with different Bragg wavelengths are arranged in a confined space. A multiple add & drop multiplexer is illustrated whose basic principle is explained, for example, in an article by G. E. Kohnke et al, "Planar waveguide Mach-Zender bandpass filter fabricated with single exposure UV-induced gratings", OFC '96 Technical Digest, page 277. This arrangement consists of several cascaded Mach-Zehnder interferometers constructed from optical waveguides. Bragg gratings are imprinted in the arms of the Mach-Zehnder interferometers. Each interferometer has a different Bragg wavelength $L_1$, $L_2$, and $L_3$. For light with this wavelength, these Bragg gratings act like mirrors. In this manner, individual wavelengths $l_1, l_2, l_3$ can be taken from signal light with wavelengths $l_1, \ldots, l_n$ and added to the signal light on the other side of the arrangement.

I claim:

1. A planar optical waveguide having a core (COR) and at least two buffer layers (BUF, CLA) each in contact with the core, the refractive index of the core (COR) being locally variable by irradiation with light of suitable wavelength and intensity, characterized in that a pattern exists in one of the buffer layers (BUF, CLA) such that a light beam passing through said patterned buffer layer (CLA) and then falling on the core (COR) will form an optical interference pattern in at least one spatially limited region of the core, thereby permanently imprinting a refractive-index grating (GRA) in said spatially limited region of the core without the use of a separate phase mask.

2. A planar optical waveguide as claimed in claim 1, characterized in that the thickness of the patterned buffer layer (CLA) varies periodically in the region of the optical waveguide in which a refractive-index grating is to be imprinted in the core (COR).

3. A planar optical waveguide as claimed in claim 2, characterized in that the periodic variation of the patterned buffer layer (CLA) is rectangular.

4. A planar optical waveguide as claimed in claim 3, characterized in that a spatially limited region of the core has a refractive-index grating.

5. A method of fabricating a planar optical waveguide with a refractive-index grating, comprising the steps of:

fabricating a planar optical waveguide having a core (COR) and at least two buffer layers (BUF, CLA) each in contact with the core, the refractive index of the core (COR) being locally variable by irradiation with light of suitable wavelength and intensity, wherein a pattern is formed in one of the buffer layers (BUF, CLA) such that a light beam passing through said patterned buffer layer (CLA) and then falling on the core (COR) will form an optical interference pattern in at least one spatially limited region of the core, thereby permanently imprinting a refractive-index grating (GRA) in said spatially limited region of the core; and illuminating the planar optical waveguide with a light beam which forms an optical interference pattern in at least one spatially limited region of the core, thereby permanently imprinting a refractive-index grating in said spatially limited region of the core without the use of a separate phase mask.

6. A method of fabricating a planar optical waveguide with a refractive-index grating, comprising the steps of:

fabricating a planar optical waveguide having a core (COR) and at least two buffer layers (BUF, CLA) each in contact with the core, the refractive index of the core (COR) being locally variable by irradiation with light of suitable wavelength and intensity, wherein a pattern is formed in one of the buffer layers (BUF, CLA) such that a light beam passing through said patterned buffer layer (CLA) and then falling on the core (COR) will form an optical interference pattern in at least one spatially limited region of the core, thereby permanently imprinting a refractive-index grating (GRA) in said spatially limited region of the core without the use of a separate phase mask, and wherein the thickness of the patterned buffer (CLA) varies periodically in the region of the optical waveguide in which a refractive-index grating is to be imprinted in the core (COR); and illuminating the planar optical waveguide with a light beam which forms an optical interference pattern in at least one spatially limited region of the core, thereby permanently imprinting a refractive-index grating in said spatially limited region of the core.

7. A method of fabricating a planar optical waveguide with a refractive-index grating, comprising the steps of:

fabricating a planar optical waveguide having a core (COR) and at least two buffer layers (BUF, CLA) each in contact with the core, the refractive index of the core (COR) being locally variable by irradiation with light of suitable wavelength and intensity, wherein a pattern is formed in one of the buffer layers (BUF, CLA) such that a light beam passing through said patterned buffer layer (CLA) and then falling on the core (COR) will form an optical interference pattern in at least one spatially limited region of the core, thereby permanently imprinting a refractive-index grating (GRA) in said spatially limited region of the core without the use of a separate phase mask, wherein the thickness of the patterned buffer (CLA) varies periodically in the region of the optical waveguide in which a refractive-index grating is to be imprinted in the core (COR), and wherein the periodic variation of the patterned buffer layer (CLA) is rectangular; and illuminating the planar optical waveguide with a light beam which forms an optical interference pattern in at least one spatially limited region of the core, thereby permanently imprinting a refractive-index grating in said spatially limited region of the core.

8. A planar optical waveguide as claimed in claim 2, characterized in that a spatially limited region of the core has a refractive-index grating.

9. A planar optical waveguide as claimed in claim 1, characterized in that a spatially limited region of the core has a refractive-index grating.

* * * * *